United States Patent [19]

Ohta et al.

[11] Patent Number: 5,202,862
[45] Date of Patent: Apr. 13, 1993

[54] MAGNETO-OPTICAL RECORDING AND REPRODUCING DEVICE HAVING INTEGRALLY FORMED RECORDING AND REPRODUCING MAGNETIC HEADS

[75] Inventors: Kenji Ohta, Kitakatsuragi; Akira Takahashi, Nara; Tetsurou Muramatsu, Nara; Tatsushi Yamamoto, Nara; Toshio Ishikawa, Nara, all of Japan

[73] Assignee: Sharp Kabushiki Kaisha

[21] Appl. No.: 713,742

[22] Filed: Jun. 11, 1991

[30] Foreign Application Priority Data

Jun. 13, 1990 [JP] Japan .................................. 2-158072
Jun. 13, 1990 [JP] Japan .................................. 2-158077
Jun. 20, 1990 [JP] Japan .................................. 2-162098

[51] Int. Cl.⁵ .................... G11B 13/04; G11B 11/14
[52] U.S. Cl. ........................ 369/13; 360/59; 360/114; 360/66
[58] Field of Search ............ 369/13, 14; 360/59, 360/66, 114, 60

[56] References Cited

FOREIGN PATENT DOCUMENTS

| | | | |
|---|---|---|---|
| 0291248 | 11/1988 | European Pat. Off. | |
| 57-105838 | 7/1982 | Japan . | |
| 59-53855 | 3/1984 | Japan . | |
| 60-127548 | 7/1985 | Japan | 369/14 |
| 61-214258 | 9/1986 | Japan | 360/114 |
| 61-278060 | 12/1986 | Japan | 360/114 |
| 62-01148 | 1/1987 | Japan | 369/13 |
| 2-42664 | 2/1990 | Japan | 360/59 |

OTHER PUBLICATIONS

Nomura, T., "Comparison of Readout Characteristics Between Magnetooptic Transfer Heads and Magnetic Heads", *IEEE Transactions of Magnetics* 25(6) p. 4474 (1989).

Takabashi, M., "Extremely High Density Magneto-Optical Recording by Using Magnetic Field Modulation Method", *Digests of the 13th Annual Conference on Magnetics in Japan*, 23aC-10, p. 198, (Nov. 22-25, 1989).

*Primary Examiner*—Hoa Nguyen
*Attorney, Agent, or Firm*—David G. Conlin; George W. Neuner

[57] ABSTRACT

A magneto-optical recording/reproducing device which records information by irradiating a light beam of constant intensity on a magneto-optical recording medium while simultaneously applying a magnetic field thereon through a recording magnetic head; and which reproduces the recorded information through a reproducing magnetic head. The magneto-optical recording medium has a magnetic film formed on a translucent substrate and the magnetic field applied through the recording magnetic head reverses in response to the information to be recorded. The recording magnetic head and the reproducing magnetic head are integrally provided on a single magnetic core in order to set their positions easily with respect to each other. By making a magnetic core end-face of the reproducing magnetic head smaller than a light beam spot, information recorded on areas smaller than the light beam spot can be reproduced. A large reproduced output may be achieved by using a magneto-optical recording medium which has a soft magnetic material layer made of soft magnetic material provided between the substrate and the magnetic film.

9 Claims, 4 Drawing Sheets

MAGNETO-OPTICAL RECORDING AND REPRODUCING DEVICE HAVING INTEGRALLY FORMED RECORDING AND REPRODUCING MAGNETIC HEADS

FIELD OF THE INVENTION

The present invention relates to a magneto-optical recording/reproducing device which records information magneto-optically and reproduces information magnetically.

BACKGROUND OF THE INVENTION

As shown in FIG. 9, a magneto-optical disk 43, serving as a magneto-optical recording medium, essentially comprises a disc-shaped transparent substrate 44 and a magnetic film 45 formed on the substrate 44.

When information is recorded on the magneto-optical disk 43 by magnetic field modulation, a light beam 41 of constant intensity is converged by an objective lens 42 and is irradiated as a light beam spot 47 on the magnetic film 45 through the substrate 44. Since the temperature of a portion of the magnetic film 45 whereon the light beam spot 47 is irradiated rises to a vicinity of the Curie temperature, the magnetic coercive force of the portion of the magnetic film 45 decreases. Here, a magnetic field is applied to the magnetic film 45 from a recording magnetic head 46, the magnetic field reversing in response to the information to be recorded. Accordingly, mutually reversed magnetization directions are formed (shown by arrows in FIG. 9) in the portions of the magnetic film 45 whereon the light beam spot 47 is successively irradiated. The information is thereby recorded.

On the other hand, when the information is to be reproduced, a light beam 41 having a constant intensity (which is weaker than the intensity during recording) is converged by the objective lens 42 and is irradiated as a light beam spot 47 on the magnetic film 45 through the substrate 44, in the same way as described above. Light is reflected by the magnetic film 45 and returns to the objective lens 42 where it is converged. Information is then reproduced by detecting a rotation of a plane of polarization of the reflected light which is converged by the objective lens 42.

When recording frequency is increased in the case where the information is recorded by magnetic field modulation, magnetic domains 49 serving as recording units and located on the magnetic film 45 become crescent shaped, as shown in FIG. 10. This was reported in the "Digests of the 13th Annual Conference on Magnetics in Japan 1989" (page 198). That is, in a case where a track 48 on the magneto-optical disk 43 moves leftwards (as shown by an arrow in FIG. 10) with respect to the light beam spot 47 due to a rotation of the magneto-optical disk 43, areas of the magnetic film 45 are successively heated up by the irradiation of the light beam spot 47 thereon and, subsequently, each of the areas begins to cool down progressively in the rightward direction. Along with the progressive fall in temperature in each of the areas, the magnetic coercive force in each of the areas also begins to progressively increase in the rightward direction. When the temperature falls below a point where the magnetic coercive force becomes greater than the magnetic field applied from the recording magnetic head 46, the magnetization directions in the areas which have cooled below this point can no longer align with a direction of the magnetic field. For this reason, information is recorded in each of the areas just before the areas cool below this point. Accordingly, the shape of each of the magnetic domains 49 conforms to the shape of the left-hand side of the light beam spot 47, i.e., a crescent shape which is convex in the leftwards direction, as shown in FIG. 10.

The length (from left to right) of each of the crescent-shaped magnetic domains 49 is smaller than the diameter of the light beam spot 47. As the recording frequency is increased, the length of each of the magnetic domains 49 decreases further. Consequently, it becomes possible to achieve a high recording density by increasing the recording frequency.

However, in the conventional configuration described above, in the case where the recording frequency is increased, it becomes difficult to reproduce information by detecting the rotation of the plane of polarization of the reflected light since a plurality of the magnetic domains 49 fall under the light beam spot 47.

SUMMARY OF THE INVENTION

An object of the present invention is to provide a magneto-optical recording/reproducing device which records information magneto-optically on areas smaller than a light beam spot and which reproduces the information magnetically.

In order to achieve the above object, a magneto-optical recording/reproducing device of the present invention is characterized in that information which is recorded magneto-optically at high density is reproduced by a magnetic head.

With the above arrangement, since the reproduction is carried out by the magnetic head, the information that has been recorded magneto-optically in the areas smaller than the light beam spot can be reproduced. For example, in a case where a main-pole type magnetic head is used, the information may be reproduced from the areas by making a magnetic core end-face of the main-pole type magnetic head smaller than the light beam spot.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory view schematically showing the configuration of a vicinity of a magnetic head of a magneto-optical disk device.

FIG. 2 is a longitudinal sectional view schematically showing the configuration of a magneto-optical disk.

FIG. 5 is an explanatory view schematically showing the configuration of a vicinity of a magnetic head of a magneto-optical disk device.

FIGS. 6 to 8 are plan views which show shapes of gaps of respective magnetic heads.

FIG. 9 is an explanatory view schematically showing the configuration of a vicinity of a magnetic head of a magneto-optical disk device.

FIG. 10 is an explanatory view showing shapes of magnetic domains on a magneto-optical disk when high density recording is carried out thereon.

DESCRIPTION OF THE EMBODIMENTS

A description of the first embodiment follows hereinbelow, referring to FIGS. 1 to 3.

Figure 1:
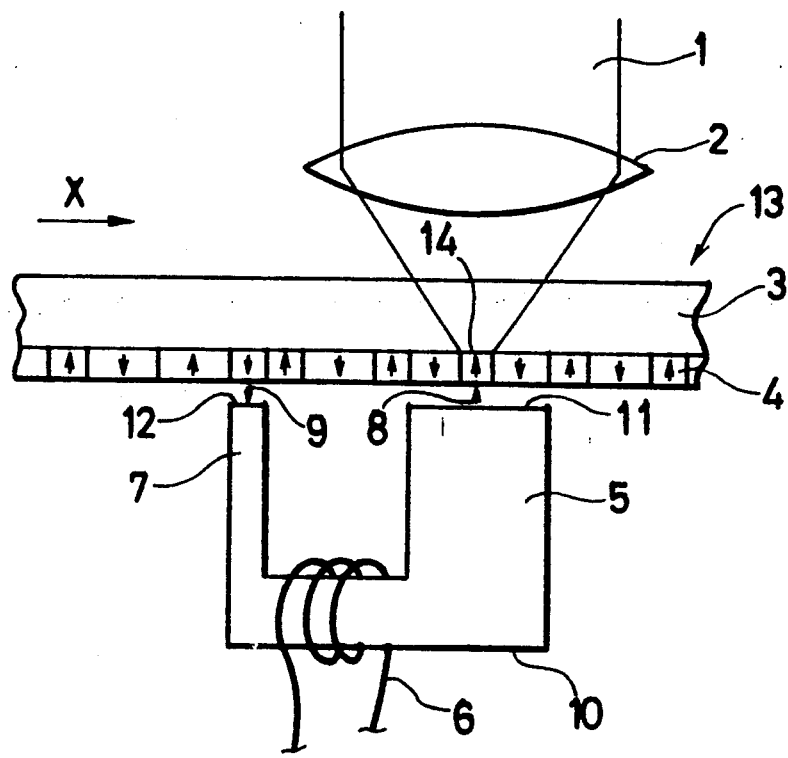
FIGS. 1 and 2 show a first embodiment of the present invention.

As shown in FIG. 1, a magneto-optical disk device as a magneto-optical recording/reproducing device of the present invention essentially comprises an objective lens 2 (converging means) for converging a light beam 1, a recording magnetic head 5 and a reproducing magnetic head 7.

Figure 2:
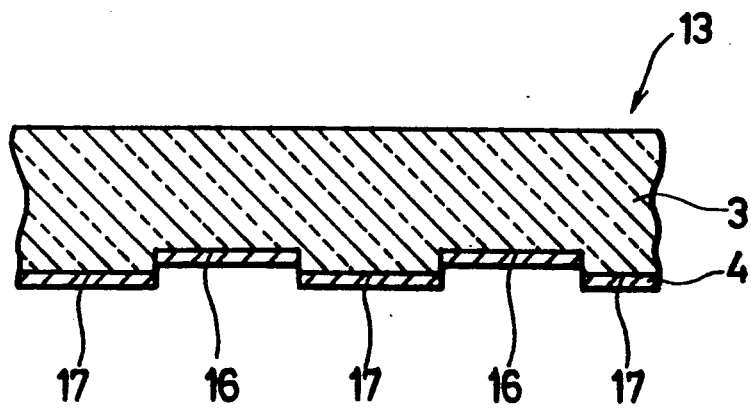

As shown in FIG. 2, a magneto-optical disk 13 serving as a magneto-optical recording medium comprises a disc-shaped translucent substrate 3 (base substance) having a helical guiding groove 16 formed thereon and a magnetic film 4 formed both on a surface of the guiding groove 16 and on lands 17 which lie between adjacent segments of the guiding groove 16.

The objective lens 2 is disposed on the substrate 3 side. The objective lens 2 converges the light beam 1 (see FIG. 1) and irradiates it as a light beam spot 14 on the magnetic film 4 of the magneto-optical disk 13.

The recording magnetic head 5 serving as an auxiliary magnetic pole and the reproducing magnetic head 7 serving as a main magnetic pole are integrally provided on a magnetic core 10. The magnetic core 10 is substantially U-shaped. A coil 6 is wound around a central portion of the magnetic core 10. The coil 6 is used for generating a magnetic field in the recording magnetic head 5 and as a pick-up for the reproducing magnetic head 7.

A magnetic core end-face 11 of the recording magnetic head 5 and a magnetic core end-face 12 of the reproducing magnetic head 7 are disposed so as to be opposite to the magnetic film 4. Further, a central portion of the magnetic core end-face 11 is disposed so as to substantially coincide with the light beam spot 14. The magnetic core end-face 11 of the recording magnetic head 5 is set to be larger than the light beam spot 14 and the magnetic core end-face 12 of the reproducing magnetic head 7 is set to be smaller than the light beam spot 14. If the magneto-optical disk 13 is rotatively driven in a direction shown by an arrow marked X in FIG. 1, the location of the reproducing magnetic head 7 with respect to the recording magnetic head 5 is set such that a direction from the reproducing magnetic head 7 toward the recording magnetic head 5 corresponds to the direction marked X.

With the above arrangement, when information is to be recorded, the light beam 1 (which has a constant intensity) is converged by the objective lens 2 and is irradiated through the substrate 3 on an area of the magnetic film 4 as the light beam spot 14. As a result, the temperature of the irradiated area on the magnetic film 4 rises to a vicinity of the Curie temperature and the magnetic coercive force of the magnetic film 4 decreases. Here, a magnetic field 8 which reverses at high frequency is applied through the recording magnetic head 5 to the entire area irradiated by the light beam spot 14. The magnetic field 8 is generated by supplying a driving current to the coil 6. The driving current reverses at high frequency corresponding to the information to be recorded. Accordingly, the information is recorded at high density in crescent-shaped magnetic domains which serve as recording units. The magnetic domains are smaller than the light beam spot 14. Furthermore, although the information can be recorded both on the guiding groove 16 and on the lands 17, it is desirable to perform the recording only on the lands 17. This is because the magnetic core end-face 12 of the reproducing magnetic head 7 can be brought closer to the magnetic film 4 on the lands 17 than to the magnetic film 4 on the guiding groove 16, thereby resulting in a higher reproduced output.

When the information is to be reproduced, the irradiation of the light beam 1 is stopped and reproduction is carried out by the reproducing magnetic head 7. That is, magnetic flux is directed from the magnetic domain of the magnetic film 4, which is opposite to the magnetic core end-face 12 of the reproducing magnetic head 7, to a central portion of the coil 6 via the magnetic core 10. The magnetic flux varies temporally due to a rotation of the magneto-optical disk 13 and, consequently, an induced electromotive force is generated across the coil 6. The induced electromotive force is reversed in response to the recorded information. The information is thereby reproduced. The information that has been recorded at high density in the areas which are smaller than the light beam spot 14 can be reproduced by the reproducing magnetic head 7 since the magnetic core end-face 12 is set to be smaller than the light beam spot 14.

In the present embodiment, both the recording magnetic head 5 and the reproducing magnetic head 7 have been integrally provided on the single magnetic core 10. Consequently, the two magnetic heads 5 and 7 can be positioned relative to each other with a high degree of accuracy. The information recorded at high density can thereby easily be reproduced. Moreover, the number of parts can be reduced, thereby permitting simplification and miniaturization of the configuration.

However, during recording of information, a magnetic field 9 is applied on the magnetic film 4 by the reproducing magnetic head 7, along with the magnetic field 8 being applied on the magnetic film 4 by the recording magnetic head 5. This is because the recording magnetic head 5 and the reproducing magnetic head 7 are integrally provided on the magnetic core 10. Furthermore, since the magnetic core end-face 12 of the reproducing magnetic head 7 is smaller than the magnetic core end-face 11 of the recording magnetic head 5, the magnetic field 9 applied by the reproducing magnetic head 7 is stronger than the magnetic field 8 applied by the recording magnetic head 5. The magnetic field 9 may even become stronger than the magnetic coercive force of the magnetic film 4 at room temperature. Consequently, in spite of the fact that the magnetic field 9 is applied on areas of the magnetic film 4 other than the areas whereon the light beam spot 14 is irradiated, the magnetic domains in the magnetic film 4 may be disturbed. In the worst case, the information may be lost.

In the present embodiment, however, the position of the reproducing magnetic head 7 with respect to the recording magnetic head 5 is set such that the direction from the reproducing magnetic head 7 toward the recording magnetic head 5 corresponds to the rotation direction (the direction marked X) of the magneto-optical disk 13. As a result, even when the magnetic domains are disturbed by the magnetic field 9 of the reproducing magnetic head 7, proper recording can be carried out immediately after by the recording magnetic head 5.

Figure 3:
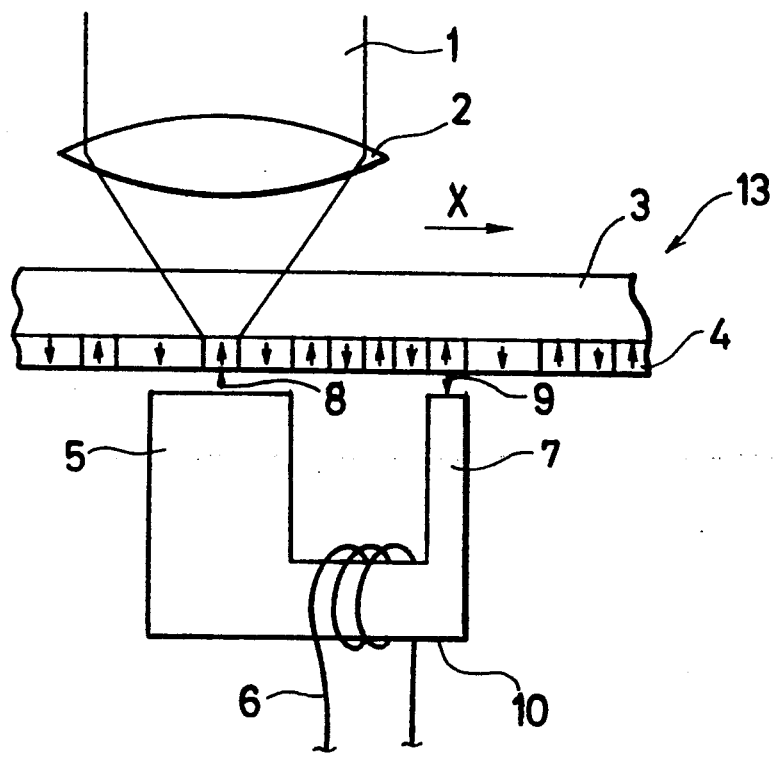
FIG. 3 schematically shows the configuration of a vicinity of a magnetic head of a magneto-optical disk device as an example for comparison.

FIG. 3 shows an opposite case where the position of the reproducing magnetic head 7 with respect to the recording magnetic head 5 is reversed. Here, the recording is carried out by the recording magnetic head 5 but, immediately after, the magnetic field 9 applied by the reproducing magnetic head 7 disturbs the magnetic domains. The reliability of information recorded in this manner is thus reduced.

In the case of reproduction of the information, the magnetic fluxes from a plurality of the magnetic domains in the magnetic film 4 are directed to the coil 6 after passing through the magnetic core 10, the magnetic domains being located opposite to the magnetic core end-face 11 of the recording magnetic head 5. This happens for the same reason as in the case when the recording is carried out. However, since the magnetic core end-face 11 is substantially larger than each of the magnetic domains, the magnetic fluxes from a substantially large number of the magnetic domains enter the magnetic core end-face 11. As a result, the temporal variation of the magnetic fluxes is minimized.

A second embodiment of the present embodiment is described hereinbelow, referring to FIG. 4. For the sake of convenience, members having the same function as in the aforementioned embodiment will be designated by the same code and their description will be omitted.

Figure 4:
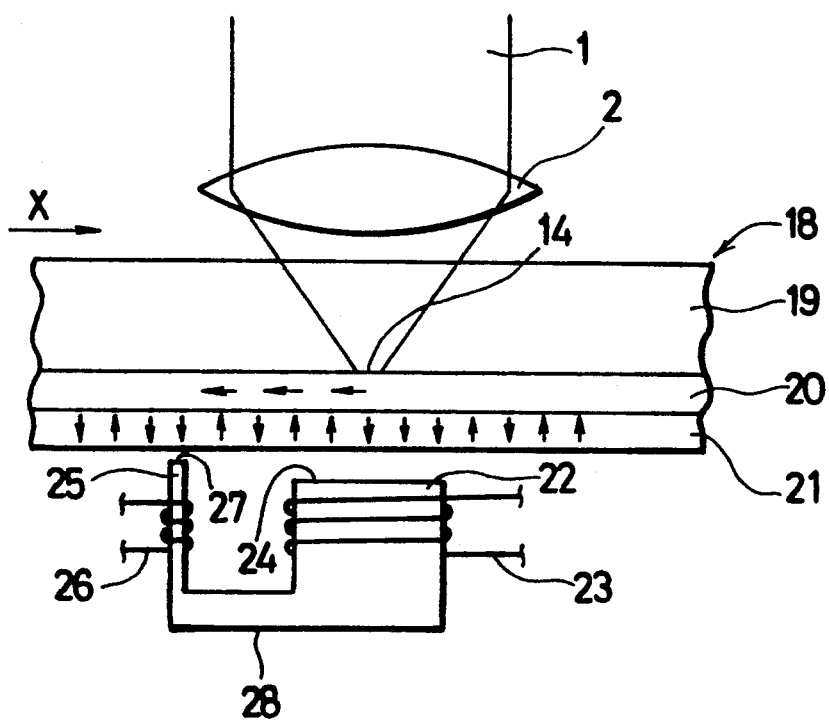
FIG. 4 is a second embodiment of the present invention and schematically shows a magneto-optical disk and a vicinity of a magnetic head of a magneto-optical disk device.

The differences between a magneto-optical disk device as a magneto-optical recording/reproducing device of the present embodiment and the magneto-optical disk device of the first embodiment are as shown in FIG. 4. That is, a height of a recording magnetic head 22 is lower than a height of a reproducing magnetic head 25; a distance between a magnetic film 21 and a magnetic core end-face 24 of the recording magnetic head 22 is greater than a distance between the magnetic film 21 and a magnetic core end-face 27 of the reproducing magnetic head 25; and a coil 23 is used exclusively during recording to generate a magnetic field and a coil 26 is used exclusively for pick-up during reproduction.

Further, a magneto-optical disk 18 as a magneto-optical recording medium of the present embodiment differs from the magneto-optical disk 13 (see FIG. 1) of the first embodiment in that a soft magnetic material layer 20 is provided between a translucent substrate 19 and a magnetic film 21. The soft magnetic material layer 20 is made from soft magnetic material having high permeability. The soft magnetic material layer 20 allows magnetic flux to easily pass therethrough in a direction parallel to the plane of the magneto-optical disk 18. Further, a helical guiding groove (not shown in FIG. 4) is formed on the substrate 19 on the side having the soft magnetic material layer 20.

With the above arrangement, when information is to be recorded, a light beam 1 having a constant intensity is converged by an objective lens 2 and is irradiated through the substrate 19 on an area of the magnetic film 21 as a light beam spot 14. As a result, the temperature of the magnetic film 21 rises to a vicinity of the Curie temperature and a magnetic coercive force of the magnetic film 21 decreases. Here, a magnetic field that reverses at high frequency is applied through the recording magnetic head 22 to the entire area irradiated by the light beam spot 14. The magnetic field is generated by supplying a driving current to the coil 23. The driving current reverses at high frequency in response to the information to be recorded. Accordingly, the information is recorded at high density in crescent-shaped magnetic domains which serve as recording units. The magnetic domains are smaller than the light beam spot 14.

When the information is to be reproduced, the irradiation of the light beam 1 is stopped and reproduction is carried out by the reproducing magnetic head 25. That is, the magnetic flux is directed from the magnetic domain on the magnetic film 21 to a central portion of the coil 26 via a magnetic core 28, the magnetic domain being located opposite to the magnetic core end-face 27 of the reproducing magnetic head 25. The magnetic flux varies temporarily due to a rotation of the magneto-optical disk 18 and an induced electromotive force is generated at both ends of the coil 26, the induced electromotive force reversing in response to the recorded information. The information is thereby reproduced. The information that has been recorded at high density in the areas which are smaller than the light beam spot 14 can be reproduced by the reproducing magnetic head 25 since the magnetic core end-face 27 is smaller than the light beam spot 14.

In the present embodiment, the height of the recording magnetic head 22 is lower than the height of the reproducing magnetic head 25 and therefore the distance between the magnetic film 21 and the magnetic core and-face 24 of the recording magnetic head 22 is greater than the distance between the magnetic film 21 and the magnetic core end-face 27 of the reproducing magnetic head 25. As a result, when the information is to be reproduced, practically no magnetic flux from the magnetic film 21 enters the magnetic core 28 through the magnetic core end-face 24 of the recording magnetic head 22. Consequently, noise no longer enters the reproducing magnetic head 25 and a high signal-to-noise ratio can be achieved.

Further, since the coil 23 is used exclusively during recording to generate the magnetic field and the coil 26 is used exclusively during reproduction for pick-up, the most appropriate coil winding and wire thickness may be selected for each of the two coils.

Moreover, the soft magnetic material layer 20 having high permeability is provided between the translucent substrate 19 and the magnetic film 21. As a result, the magnetic flux from the magnetic film 21 can easily return to its point of origin by passing through the magnetic core end-face 27 of the reproducing magnetic head 25, which serves as a main magnetic pole, out from the magnetic core end-face 24 of the recording magnetic head 22, which serves as an auxiliary magnetic pole, and then through the soft magnetic material layer 20. Since a magnetic circuit is formed due to the soft magnetic material layer 20, the magnetic flux from the magnetic film 21 enters the magnetic core 28 more efficiently resulting in an increase in the reproduced output of the reproducing magnetic head 25.

Furthermore, since the information is reproduced by the reproducing magnetic head 25, the light beam 1 is no longer necessary during reproduction. Consequently, the soft magnetic material layer 20 may equally be opaque.

In the case where the soft magnetic material layer 20 is opaque, the soft magnetic material layer 20 becomes heated during recording because the light beam 1 is absorbed by the soft magnetic material layer 20. However, since the soft magnetic material layer 20 can be made thin, the magnetic film 21 also gets heated due to thermal conduction. As a result, recording may be carried out without hindrance.

The substrate 19 of the magneto-optical disk 18 may specifically be formed from, for example, glass, epoxy resin or other resins such as PC (polycarbonate), APO (amorphous polyolefin), PMMA (polymethyl methacrylate).

The soft magnetic material layer 20 may be formed from soft magnetic material having high permeability, such as Fe or Ni-Fe alloy (permalloy).

The magnetic film 21 may be a vertically magnetized film formed from, for example, TbFeCo, DyFeCo, GdTbFe, MnBi, MnBiCu, PtCo or PtMnSb. A horizontally magnetized film formed from $CrO_2$ may equally be used.

A third embodiment of the present invention is described hereinbelow, referring to FIGS. 5 to 8. For the sake of convenience, members having the same function as in the aforementioned embodiment will be designated by the same code and their description will be omitted.

Figure 5:
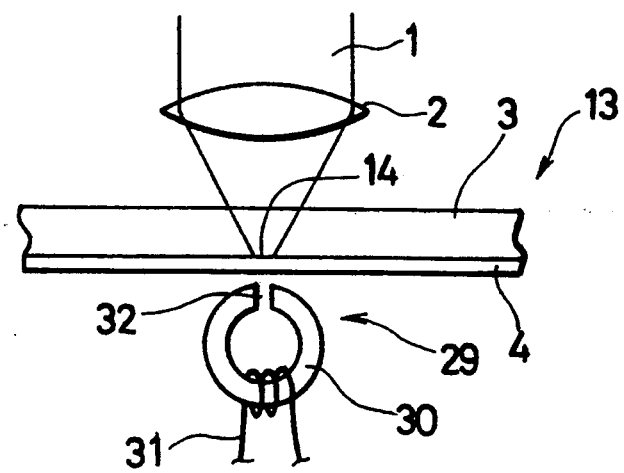
FIGS. 5 to 8 show a third embodiment of the present invention.

As shown in FIG. 5, a magneto-optical disk device as a magneto-optical recording/reproducing device of the present embodiment differs from the magneto-optical disk device of the first embodiment in that a ring-shaped magnetic head 29 is provided, the magnetic head 29 serving as a recording magnetic head as well as a reproducing magnetic head.

The magnetic head 29 comprises a ring-shaped magnetic core 30 which has a gap 32. The magnetic core 30 has a coil 31 wound thereon. The magnetic head 29 is located proximate and opposite to a magnetic film 4. Further, a central portion of the gap 32 of the magnetic head 29 is positioned so as to be substantially coincident with the light beam spot 14.

Figure 6:
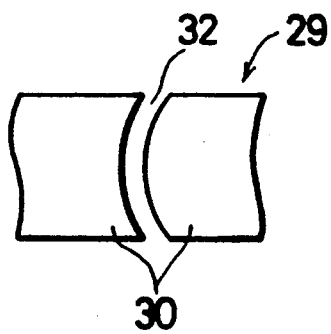

FIG. 6 shows the shape of the gap 32 when seen from the side of the magnetic film 4. The gap 32 is substantially crescent shaped and corresponds to the shape of crescent-shaped magnetic domains formed when high density recording is carried out by magnetic field modulation. Gap length is substantially uniform and corresponds substantially to a length of each of the magnetic domains. Further, a track width (a width of the magnetic core 30 from top to bottom as shown in FIG. 6) is greater than a width of lands (see FIG. 2) of a magneto-optical disk 13 and is either equivalent to or less than a track pitch (a pitch of a guiding groove). Specifically, the gap length may be set, for example, to correspond to the length of each of the magnetic domains at 0.1–0.3 μm and the track width may be set to 1–2 μm, if the width of the lands is 1–1.5 μm.

With the above arrangement, information may be recorded and reproduced in the same way as described in the first embodiment.

Since the present embodiment comprises the ring-shaped magnetic head 29 which serves as both the recording magnetic head and the reproducing magnetic head, the information recorded at high density can easily be reproduced. Moreover, the number of parts can be reduced, thereby permitting simplification and miniaturization of the configuration of the magneto-optical disk device.

Moreover, compared to a case where a gap is of a linear shape, deterioration of signal quality and lowering of reproduced output due to azimuth loss and crosstalk from adjacent magnetic domains are reduced since the substantially crescent shaped gap 32 (see FIG. 6) coincides with the shape of the crescent-shaped magnetic domains formed when high density recording is carried out by magnetic field modulation. As a result, the signal quality is remarkably improved and a high reproduced output can be attained.

Figure 7:
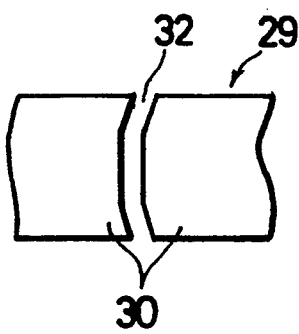
Figure 8:
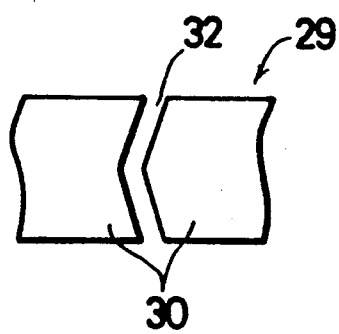
Figure 9:
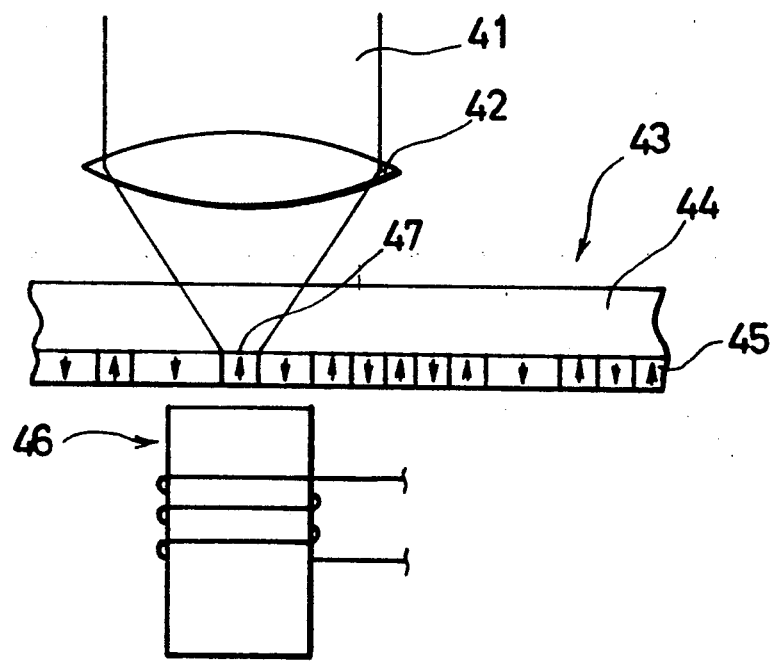
FIGS. 9 and 10 show conventional examples.
Figure 10:
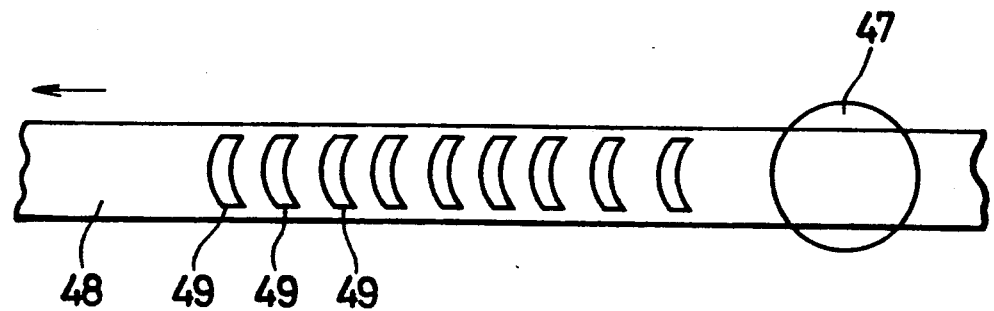

The crescent shape of the gap 32 is achieved by forming two arcs or two substantially arc-shaped curved lines which are parallel and separated by a distance equal to the gap length. However, as shown in FIGS. 7 and 8, a substantial crescent shape may equally be achieved by means of arranging a plurality of straight lines. The gap 32 can be formed much more easily by the arrangement of the plurality of straight lines than by curved lines.

As described above, the magneto-optical disk device of the present embodiment carries out reproduction using the magnetic head 29 and not the light beam 1. As a result, it becomes possible to reproduce the information recorded at high density in the crescent-shaped magnetic domains, the magnetic domains being smaller than the light beam spot 14. Moreover, since the magnetic head 29 serves both as the recording magnetic head and the reproducing magnetic head, it is no longer necessary to accurately set positions of a recording magnetic head and a reproducing magnetic head with respect to each other, as is particularly required during high density recording and reproduction. Consequently, a high reproduced output can easily be attained compared to the case where the recording magnetic head and the reproducing magnetic head are provided separately.

Moreover, since high density recording and reproduction are carried out only on the magnetic film 4 provided on lands 17 (see FIG. 2) of the magneto-optical disk 13, the gap 32 of the magnetic head 29 can be brought closer to the magnetic film 4, compared to the case where high density recording and reproduction are carried out on the magnetic film 4 provided on the guiding groove 16. As a result, during reproduction a high reproduced output can be achieved. Further, since a driving current supplied to the coil 31 during recording can be reduced, the magnetic head 29 can be of a smaller size and weight, making lower electrical consumption possible.

In the magnetic film 4 whereon high density magneto-optical recording and magnetic reproduction are performed, ferro-magnetic material is preferable over ferri-magnetic material made of amorphous rare-earth transition metal alloys etc. The ferri-magnetic material is normally used in the case where magneto-optical recording and optical reproduction are performed. The ferro-magnetic material has a higher residual magnetization than the ferri-magnetic material and is therefore preferred because the reproduced output increases. Specifically, a Co/Pt multi-layered film, a CoCr alloy film, an NdFe alloy film, an MnBi alloy film or the like may, for example, be used as the magnetic film 4. Further, instead of a vertically magnetized film such as described above, a horizontally magnetized film made of $CrO_2$ etc. may of course equally be used. Additionally, the fact that the Curie temperature lies within a temperature range of 200°–300° C. makes magneto-optical recording convenient.

In the present embodiment, a laser light of wavelength 780 nm has been used as the light beam 1 along with the objective lens 2 having an NA (numerical aperture) of 0.5. However, a laser light of wavelength 830 nm and an objective lens 2 of NA 0.6 may equally be used. A substrate 3 of the magneto-optical disk 13 is formed from glass, acrylic resin or other synthetic resins such as polycarbonate and is 1-2 mm thick.

Further, a substantial crescent shape may be given to the magnetic core end-face 12 of the reproducing magnetic head 7 serving as the main magnetic pole (see FIG. 1) described in the first embodiment, and to the magnetic core end-face 27 of the reproducing magnetic head 25 serving as the main magnetic pole (see FIG. 4) described in the second embodiment. This reduces deterioration of signal quality and lowering of reproduced output due to azimuth loss and crosstalk from the adjacent magnetic domains, as in the case described above in the third embodiment where the gap 32 of the ring-shaped magnetic head 29 is given a crescent shape. Consequently, the signal quality is remarkably improved and a high reproduced output can be attained.

In the above embodiments, the information is recorded at high density only on the magnetic film 4 provided on the lands 17 (see FIG. 2). As regards the unused magnetic film 4 provided on the guiding groove 16, information may be recorded at an appropriate degree of recording density so that optical reproduction is possible. Here, optical reproduction may be carried out as is normally done by detecting a rotation of a plane of polarization of a reflected light. Accordingly, the entire surface of the magnetic film 4 provided on the magneto-optical disk 13 can be effectively used.

Moreover, the application of the magneto-optical recording/reproducing device is not limited to the magneto-optical disk device described above. It may be equally applied in magneto-optical card devices which use a magneto-optical card as a magneto-optical recording medium, and in magneto-optical tape devices which use a magneto-optical tape as a magneto-optical recording medium. Further, the configuration of the magneto-optical disk 18 which comprises the soft magnetic material layer 20 (see FIG. 4) is also applicable in the case where the magneto-optical card or the magneto-optical tape is used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording and reproducing device, comprising:
    light converging means for converging a light beam of substantially constant intensity and irradiating the light beam as a light beam spot on a predetermined area of a magnetic film, the light converging means being disposed on a translucent-substrate side of a magneto-optical recording medium, the substrate having a guiding groove provided thereon and having the magneto film formed thereon;
    a recording magnetic head for recording information by applying a magnetic field on the area on the magneto-optical recording medium where the light beam is irradiated as the light beam spot by the light converging means, the magnetic field reversing in response to the information to be recorded and the recording magnetic head being disposed on a magnetic-film side of the magneto-optical recording medium; and
    a reproducing magnetic head for reproducing the information by detecting temporal variations of magnetic flux from the magnetic film, the reproducing magnetic head being disposed on the magnetic-film side of the magneto-optical recording medium,
    wherein the recording magnetic head and the reproducing magnetic head are integrally provided in a single magnetic core as a auxiliary magnetic pole and a main magnetic pole, respectively, and
    a magnetic core end-face of the main magnetic pole of the reproducing magnetic head disposed opposite to the magneto-optical recording medium is set to be smaller than the light beam spot, and a magnetic core end-face of the auxiliary magnetic pole of the recording magnetic head disposed opposite to the magneto-optical recording medium is set to be larger than the light beam spot.

2. The magneto-optical recording and reproducing device as set forth in claim 1, wherein the magneto-optical recording medium is driven in a direction from the reproducing magnetic head toward the recording magnetic head.

3. The magneto-optical recording and reproducing device as set forth in claim 2, wherein recording and reproduction are carried out only on and from the magnetic film formed on lands, the lands being located between adjacent segments of the guiding groove of the magneto-optical recording medium.

4. The magneto-optical recording and reproducing device as set forth in claim 3, wherein a distance between the magnetic core end-face of the recording magnetic head and the magneto-optical recording medium is greater than a distance between the magnetic core end-face of the reproducing magnetic head and the magneto-optical recording medium.

5. A magneto-optical recording and reproducing device comprising:
    light converging means for converging a light beam of substantially constant intensity and irradiating the light beam as a light beam spot on a predetermined area of a magnetic film, the light converging means being disposed on a translucent-substrate side of a magneto-optical recording medium, the substrate having a guiding groove provided thereon and having the magnetic film formed thereon; and
    a recording and reproducing magnetic head for recording information by applying a magnetic field on the area on the magneto-optical recording medium where the light beam is irradiate as the light beam spot by the light converging means, the magnetic head comprising a coil wound around a ring-shaped magnetic core with a gap portion, the magnetic field reversing in response to information to be recorded, as well as for reproducing the information by detecting temporal variation of magnetic flux form the magnetic film, the recording and reproducing magnetic head being disposed on a magnetic-film side of the magneto-optical recording medium.

6. The magneto-optical recording and reproducing device as set forth in claim 5, wherein the gap is formed in a substantially crescent shape, the crescent shape corresponding to a shape of magnetic domains serving as recording units on the magneto-optical recording medium.

7. A magneto-optical recording and reproducing device, comprising:

light converging means for converging a light beam of substantially constant intensity and irradiating the light beam as a light beam spot on a predetermined area of a magnetic film, the magnetic converging means being disposed on a translucent-substrate side of a magneto-optical recording medium, the substrate having a guiding groove provided thereon and having the magnetic film formed thereon;

a recording magnetic head for recording information by applying a magnetic field on the area on the magneto-optical recording medium where the light beam is irradiated as the light beam spot by the light converging means, the magnetic field reversing in response to the information to be recorded and the recording magnetic head being disposed on a magnetic-film side of the magneto-optical recording medium; and a reproducing magnetic head for reproducing the information by detecting temporal variation of magnetic flux from the magnetic film, the reproducing magnetic head being disposed on the magnetic-film side of the magneto-optical recording medium, wherein the recording magnetic head and the reproducing magnetic head are integrally provided in a single magnetic core as an auxiliary magnetic pole and a main magnetic pole respectively, and the magneto-optical recording medium being driven in a direction from the reproducing magnetic head toward the recording magnetic head.

8. The magneto-optical recording and reproducing device as set forth in claim 7, wherein recording and reproduction are carried out only on and from the magnetic film formed on lands, the lands being located between adjacent segments of the guiding groove of the magneto-optical recording medium.

9. The magneto-optical recording and reproducing device as set forth in claim 8, wherein a distance between the magnetic core end-face of the auxiliary magnetic pole of the recording magnetic head and the magneto-optical recording medium is greater than a distance between the magnetic core end-face of the main pole of the reproducing magnetic head and the magneto-optical recording medium.

* * * * *